United States Patent Office

3,255,172
Patented June 7, 1966

3,255,172
WATER SOFTENER FROM KERATINACEOUS MATERIALS MODIFIED WITH ALKALI HYDROXIDES AND WATER
John J. Krajewski, Wheeling, and Harry T. Anderson, Clarendon Hills, Ill., assignors to Swift & Company, Chicago, Ill., a corporation of Illinois
No Drawing. Filed Jan. 29, 1962, Ser. No. 169,626
8 Claims. (Cl. 260—123.7)

This invention relates to the production of a novel composition of matter and to a process for the production of such composition of matter. The present discovery also relates to solution treatment and to the recovery of metal ions therefrom. More particularly, the invention relates to the modification of a proteinaceous material with a basic substance and subsequent use of this modified material in the production of soft water.

Commercially available ion exchange resins are currently enjoying widespread use in the areas of water treatment to produce soft water and, also, for the recovery of certain metal ions from dilute solutions, for example, as encountered during the isolation of uranium. These resins are derived in two fundamental manners. One pathway to these resins is by chemically treating cross-linked or netted Bakelite-like resins to introduce a large number of acidic or basic functional groups. Generally, modification of netted polymers is unsatisfactory in a number of respects. Consequently, an alternative route to the production of ion exchange resins of high capacity involves the polymerization of monomers which already contain the desired functional groups with cross-linking agents, thus producing a high-capacity resin. However, commercially available resins suffer from the disadvantage of being expensive and/or difficult to produce.

Although keratinaceous materials have been previously observed to have some degree of ion exchange capacity, they have not enjoyed commercial use for the following reasons: poor capacity, poor flow rate, and, also, the susceptibility to bacterial action.

Accordingly, it is an object of this invention to provide ion exchange resins having good capacity while maintaining superior flow characteristics.

It is also an object to provide ion exchange resins which are not susceptible to bacterial action.

Another object is to provide a method for manufacturing ion exchange resins having good capacity and flow rate.

It is also an object of this invention to provide ion exchange resins which are easily regeneratable.

A further object is to provide a method for the production of soft water for industrial uses.

A still further object is to provide ion exchange resins which are relatively inexpensive.

Additional objects, if not specifically set forth herein, will be readily apparent to those skilled in the art from the detailed description of the invention which follows.

In general, the invention is concerned with the treatment of proteinaceous material to form very valuable and effective ion exchange material. The ion exchange resins are prepared by treatment of the proteinaceous material with a base in a minimum amount of water. This invention provides a method for the production of effective ion exchange resins from relatively inexpensive sources.

More specifically, the ion exchange resins of this invention are prepared by the treatment of keratinaceous material with a base, preferably calcium hydroxide, although other bases may be used. The keratinaceous material is mixed with the base and a minimum amount of water, just sufficient to wet the mixture, is added. The wetted mixture is permitted to set at room temperature for a period of time, usually up to 4 hours. This treatment, by way of hydrolysis, essentially accomplishes the liberation of a great number of carboxyl groups, along with a concomitant evolution of ammonia from terminal amide groups. The capacity of the material to act as an ion exchange resin (remove calcium and magnesium ions from the water) increases about tenfold due to the base treatment.

The proteinaceous material which may be treated in accordance with the method of the invention includes proteinaceous material which is insoluble in water over a wide pH range. Also, the proteinaceous material must have available carboxyl groups. One example of the available carboxyl groups are those found in glutamic and aspartic acid residues in keratin. Keratinaceous material such as feathers, wool, hoof meal, etc. in the form of fibers, threads, granules, and similar small particles form a very effective ion exchange material.

A proper balance should be maintained between the amount of protein, base, and water. The amount of base is usually ½ to 2½% based on the amount of keratin when lime is employed, however, the amount may vary somewhat when other bases are utilized. Usually a minimum amount of water, just sufficient to wet the mixture, is used since a very dilute solution produces only swollen particles without effectively creating an ion exchange capacity to the extent desired unless an unreasonably long time is employed. When large quantities of water are used with lime, the evolution of ammonia is retarded and the rate of reaction is very slow.

Alkalies other than lime may be used such as the alkali metal and alkaline earth metal oxides and hydroxides. Such specific alkalies include $Na_2O$, $K_2O$, $MgO$, $BaO$, etc. However, it was found that the reaction with lime could be controlled easily. Also, lime is not as randomly degradative to the keratin and any excess is easily removed.

To improve the color and condition of the modified keratin, the product is treated with an oxidizing agent. This oxidation step also renders the product regeneratable with brine. If the oxidation step is omitted, it is necessary to employ an acid wash to regenerate the modified material and recover the ion exchange activity.

The oxidation step is carried out at a pH of at least 7, usually a pH of 8–9 and, of course, reagents other than hydrogen peroxide may be used. For example, organic peracids such as peracetic, performic and other lower alkanoic peracids are quite satisfactory. Similarly, perinorganic acids or their salts will also function to perform the desired effect. Among such reagents are, for example, persulfuric or pernitric acid and their ammonium, sodium or other metal salts. Also, chromates, perchlorates, and permanganates are useful. Sodium hypochlorite has a very beneficial effect also.

Although a beneficial effect in the oxidation step is a bleaching effect, the main desired effect is to render the product regeneratable with brine. It appears that the oxidation of the modified keratin produces N-oxides of some of the amino acids to yield a structure which forms weaker chelate bonds with heavy metal salts in conjunction with the free carboxyl groups. This type of structure permits easy regeneration with a brine solution.

The treatment of the resin with peroxide results in a product which is relatively stable towards putrefaction. After the oxidation treatment, the product can be treated with hyperchlorite ion, a dilute (1–5%) formaldehyde solution or other protein tanning agents in order to stabilize the product towards bacterial decay. The product can then be washed, dried and stored for use.

A commercial grade of hoof meal was secured and evaluated in a standard glass tube of ¾ inch inside diameter and 36 inches in length. A 24-inch bed of this hoof meal was placed in this unit.

It was observed that an unmodified hoof meal column had the ability to reduce the hardness of feed water (8 grains) to less than ½ grain. Water obtained in this manner had an objectionable odor, as well as some color. When the ion exchange column was left in a static condition for a period of time, the odor and color of the processed water increased. The flow rate was similarly impaired when the column was allowed to remain inactive for a period of time.

Of the tests that were conducted with a satisfactory flow rate of 2–3 gallons of water per minute per cubic foot of ion exchange material, the capacity of the hoof meal was found to be 0.8 to 1.2 kilograins per cubic foot.

Regeneration of crude hoof meal with a sodium chloride solution was almost impossible. In attempted regenerations with brine, salt was so well absorbed by the hoof meal that unreasonable quantities of water were consumed in the removal of the salt.

The examples which follow show the modification of keratin to produce the desired ion exchange material.

*Example I*

Hoof meal was treated with 1% by weight of hydrogen peroxide or sodium hypochlorite at ambient temperatures for about ½ to 1 hour to produce a substance having an improved color. This product proved to have a much higher ion exchange capacity than the crude hoof meal. When used to treat water of 7.9 to 8.1 grain hardness, a capacity of 2.5 to 3.5 kilograms per cubic foot of ion exchange material was observed with an effluent water of zero hardness. The resin could be regenerated with a 2% sodium chloride solution with subsequent washing with 4 liters of distilled water. Continued operation of this ion exchange column resulted in a soft water of very high polish with no perceptible odor or color.

Upon using this resin after an extended inactive state, however, the discharge water bore light odor and some color. If the resin was allowed to remain static in the presence of brine, no reversion could be detected.

*Example II*

Crude hoof meal (14–20 mesh) was treated with .5 to 2.5% lime in the presence of sufficient water to permit even wetting before the mixture thoroughly agitated. The reaction mass resulted in the evolution of ammonia and the concomitant production of free carboxyl groups by hydrolysis of amides. At room temperatures the reaction was completed in about one hour. Excess lime and calcium ions were removed by soaking in 5% hydrochloric acid, draining or filtering, followed by washing with water.

In order to obtain a more stable product, the hoof meal was then soaked in dilute (1–5%) formaldehyde solution overnight. The resulting product functioned as a hydrogen ion exchange material (regeneratable with acid) and had a capacity of 8+ kilograms per cubic foot of resin. The effluent water was of high polish and low odor, while the hardness was reduced to very nearly zero. Water discharge from this resin was of low pH. Static resin beds of this material showed good stability.

*Example III*

200 grams of hoof meal was treated with 5 grams of lime as in Example II and washed with water to a pH value equal to 9. Oxidation with 1% by weight of hydrogen peroxide for 1 hour at room temperature, treatment with 5% hydrochloric acid solution and regeneration with 4 liters of 2% sodium chloride solution yielded a resin of high capacity (8+ kilograms per cubic foot). After rinsing with water this resin produced soft water at a pH of 8.1 until 3 kilograins of hardness per cubic foot of ion exchange resin had been adsorbed, after which time the pH dropped to 4 and the resin continued to operate as a hydrogen ion exchange unit. Treatment with formaldehyde or other protein tanning agent stabilized the product towards bacteriological susceptibility. Water of high polish with no odor is produced, even if this resin remains in a static condition for a prolonged time.

The process of producing ion exchange resins from keratin may be modified in several respects. We have found, however, that a superior product is produced when the resin is treated with the base, the oxidizing agent and the bacteria decay preventative in that order.

The modified keratin may be treated to yield ion exchange materials of different characteristics. For example, treatment of the modified keratin with nitrous acid, nitrite salts or even organic nitrites such as ethyl or other alkyl nitrites will cause the keratin to have a different pKa value without effectively altering the capacity. Carboxymethylation of keratin with chloro-, bromo-, or iodoacetic acid in alkaline solution substantially increased the over-all capacity of the resin. Similarly, the resin can be sulfonated with the proper reagent such as sulfur trioxide-pyridine complex to effect an increase in capacity by undergoing sulfamation of the reacted amine and amide groups. Bases other than pyridine can be used in complexing the sulfur trioxide. On the other hand, the cationic capacity can be decreased or the anionic capacity increased by treating anhydrous keratin in anhydrous benzene with epichlorohydrin followed by treatment with an inorganic amine, for example, triethylamine.

One of the fields of utility for the material lies in the area of treating industrial water. The over-all object is the production of a soft water for industrial potable use. Such industrial applications lie in the treating of boiler water or producing water for the polymerization industry. Recovery of trace metal ions from dilute solutions as in ore recovery is another facet of this material. In general, our product may be used in all ion exchange applications which are well known to those familiar with the field of ion exchange resins.

The invention has been described with particularity as to hoof and horn meal. However, the use of other keratinaceous materials is clearly contemplated. The criteria which render various proteinaceous material useful in this invention are insolubility in water over a wide pH range and, also, the availability of carboxyl groups in the protein.

Obviously, many modifications and variations of the invention as hereinbefore set forth may be made without departing from the spirit and scope thereof and, therefore, only such limitations should be imposed as are indicated in the appended claims.

We claim:
1. A process for the production of an ion exchange resin which comprises: mixing a keratinaceous substance with a base selected from the group consisting of alkali metal and alkaline earth metal oxides and hydroxides in the presence of a minor amount of water, said minor amount being just suffiicent to wet the mixture.
2. The process of claim 1 wherein the ion exchange resin is freed from any substantial amount of excess base by washing and is treated with an oxidizing agent and a bacteria decay preventative.
3. A process for the production of an ion exchange resin which comprises: mixing a keratinaceous substance with about ½% to about 2½% by weight, based on the amount of the keratinaceous substance, of a base selected from the group consisting of alkali metal and alkaline earth metal oxides and hydroxides in the presence of a minor amount of water, said minor amount being just sufficient to wet the mixture.
4. The process of claim 3 wherein the base is lime.
5. The process of claim 3 wherein the keratinaceous substance is horn meal.

6. The process of claim 3 wherein the keratinaceous substance is hoof meal.

7. A process for the recovery of metal ions comprising: passing a solution of metal ions in contact with the surfaces of solid, small particles of a modified keratinaceous substance, said substance having been modified by mixing the keratinaceous substance with a base selected from the group consisting of alkali metal, and alkaline earth metal oxides and hydroxides in the presence of a minor amount of water, said minor amount being just sufficient to wet the mixture.

8. As a composition of matter, a modified keratinaceous substance, said substance having the characteristic of being insoluble over a wide pH range and having been modified by treatment with a base, said treatment comprising mixing the keratinaceous substance with a base selected from the group consisting of alkali metal and alkaline earth metal oxides and hydroxides in the presence of a minor amount of water, said minor amount being just sufficient to wet the mixture.

References Cited by the Examiner

UNITED STATES PATENTS

| 220,532 | 10/1879 | Hamilton | 8—127.5 |
| 2,164,156 | 6/1939 | Liebknecht | 260—123.7 |
| 2,667,475 | 1/1954 | Fick | 260—123.7 |

FOREIGN PATENTS 247,944  4/1927  Great Britain.

OTHER REFERENCES

Calmon et al., Ion Exchangers in Organic and Biochemistry, page 13 (1957), Interscience Publishers, New York.

Kunin, Ion Exchange Resins, page 204 (1958), John Wiley and Sons, New York, 2nd Edition.

WILLIAM H. SHORT, *Primary Examiner.*

JOSEPH L. SCHOFER, *Examiner.*

J. C. MARTIN, C. A. WENDEL, *Assistant Examiners.*